W. J. BRUCE.
DEMOUNTABLE RIM FOR AUTOMOBILE WHEELS.
APPLICATION FILED JUNE 23, 1919.
1,347,144. Patented July 20, 1920.
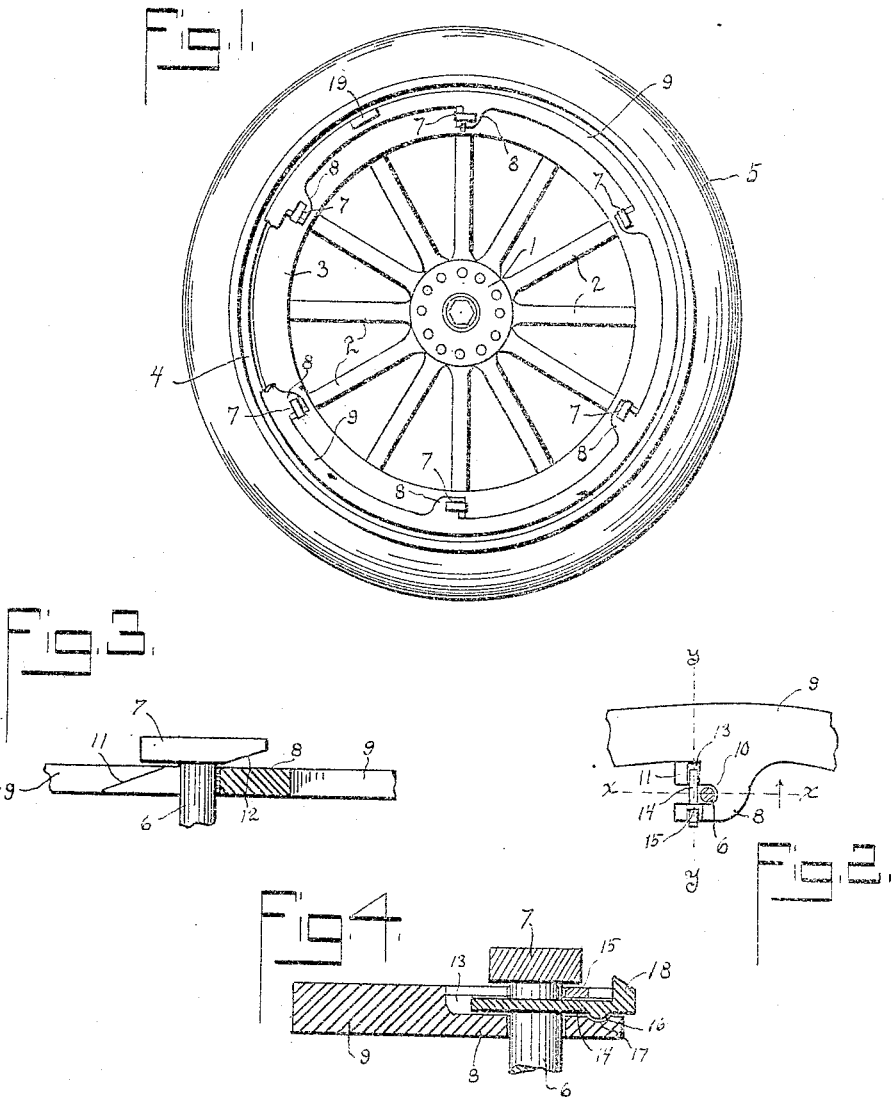
Inventor
William J. Bruce,
By Walter N. Haskell,
his Attorney

UNITED STATES PATENT OFFICE.

WILLIAM J. BRUCE, OF STERLING, ILLINOIS.

DEMOUNTABLE RIM FOR AUTOMOBILE-WHEELS.

1,347,144.  Specification of Letters Patent.  Patented July 20, 1920.

Application filed June 23, 1919. Serial No. 306,248.

*To all whom it may concern:*

Be it known that I, WILLIAM J. BRUCE, a subject of the King of Great Britain, residing at Sterling, in the county of Whiteside and State of Illinois, have invented certain new and useful Improvements in Demountable Rims for Automobile-Wheels, of which the following is a specification.

My invention has reference to demountable rims for automobile wheels, and has for its purpose to provide a simple and effective means whereby the outer rim and tire secured thereto may be easily and expeditiously detached from the wheel. It is a recognized fact that whenever it becomes necessary to change or repair a pneumatic tire, especially when on the road, it is desirable to accomplish such operation with all possible speed. As at present constructed the outer rim is attached to the felly of the wheel by a number of bolts and nuts, each of which has to be loosened or released before the rim can be removed, and again tightened when returning the rim to place. This results in a tedious and difficult operation, even for those who are able to and accustomed to handling tools, but almost impossible of accomplishment by women or young people. By the use of my device the parts of the wheel are held together in such a manner that they can be released by two or three blows of a hammer, and can be as readily replaced.

In the drawings:

Figure 1 shows an automobile wheel, in side elevation, equipped with my invention.

Fig. 2 is an enlarged detail of one of the lugs 8.

Fig. 3 is a cross-section on the broken line *x—x* of Fig. 2.

Fig. 4 is a cross-section on the line *y—y* of Fig. 2.

The first figure of the drawings shows the outer face of an automobile wheel, in which 1 is the hub, 2 the spokes, and 3 the felly supported thereby. 4 is the outer rim, loosely encircling the felly 3, and carrying the usual tire 5. At intervals the felly 3 is provided with bolts 6, passing through such felly and fitted on their outer ends with heads 7, of a clip formation. The inner ends of the bolts 6 are threaded and provided with nuts, not shown in the drawings herein.

The heads 7 are adapted for engagement with the outer faces of a series of lugs 8, projecting inwardly from a ring 9, of suitable dimensions to cover the joint between the felly 3 and rim 4, as will appear in Fig. 1 where a part of said ring is shown broken away. Each of the lugs 8 is provided with a recess 10, adapted to receive a corresponding bolt 6. The forward edges of said lugs are inclined, as shown at 11, and the heads 7 are provided on their lower faces with oppositely disposed beveled faces 12. When such parts are driven together the ring 9 is forced tightly against the faces of the felly 3 and rim 4, holding the outer rim tightly in position. All of the lugs can be simultaneously seated beneath the several bolt-heads by imparting to the ring 9 a slight amount of rotation, the heads being always in position with their beveled ends toward the lugs. The nuts on the inner ends of the bolts 6 are adjusted so that a space is left between the head 7 thereon and the felly 3 to accommodate the lug 8 at its thickest point, and when the bolts are fully seated in the ends of the recesses 10, with the flat inner faces of the heads against the flat outer faces of the lugs, as shown in Fig. 3, said lugs and heads will be in close contact, so as to clamp the rim tightly in place. Said parts can be released by giving to the ring 9 a slight rotation in the direction opposite to that by which the parts were engaged. This can be accomplished by the blow of a hammer or other tool.

One of the lugs 8 is provided with a groove 13, suited to receive a pin 14, which is slidably held therein by means of a bar 15, connected with the lug. On its lower face the pin 14 has a slight projection 16, adapted to enter a depression 17 in the inner face of the groove 13, and hold said pin from accidental release. At its outer end the pin 14 is provided with a head 18, by means of which it can be forced into position in the groove, or driven therefrom. When the pin is in position it locks the bolt 6 in front of which it is held, in place in the recess 10, and prevents separation of the bolt and lug, thus preventing any movement of the ring 9, and preventing accidental release of any of the lugs.

In case of a puncture or other tire trouble, the pin 14 is first driven out, and the ring 9 turned to release all of the lugs 8. This does not require the use of any special tool, as is now the case with most demountable rims, and in fact, if no tool is handy the work can be accomplished with a stone or other article of sufficient weight. To aid in giving to the ring 9 the desired turning movement such ring is provided with one or more outwardly projecting lugs, as at 19, which can be struck at either end with a hammer or other tool.

What I claim and desire to secure is:

In a device of the class described, in combination with a wheel and an auxiliary rim mounted removably thereon, a series of bolts fixed in the felly of said wheel, and provided with engaging members on their outer ends; a ring adapted to hold said auxiliary rim in place on said wheel; a plurality of lugs projecting inwardly from said ring and adapted for connection with said bolts and engaging members; and a lock-pin removably held in one of said lugs, and capable of holding such lug and the accompanying bolt from accidental release.

In testimony whereof I affix my signature.

WILLIAM J. BRUCE.